United States Patent [19]

Pike et al.

[11] Patent Number: 4,524,176
[45] Date of Patent: Jun. 18, 1985

[54] ACRYLIC MODIFIED POLYESTER ANAEROBIC ADHESIVE

[75] Inventors: Roscoe A. Pike, Windsor; Foster P. Lamm, South Windsor, both of Conn.

[73] Assignee: United Technologies Corporation, Hartford, Conn.

[21] Appl. No.: 591,736

[22] Filed: Mar. 21, 1984

[51] Int. Cl.³ .................. C08L 67/06; C08G 63/46
[52] U.S. Cl. .......................................... 525/12; 525/11; 525/23; 525/48; 525/445; 525/921; 523/176; 528/297
[58] Field of Search .................. 525/10, 11, 12, 23, 525/445, 48, 39, 921; 528/297; 523/176

[56] References Cited

U.S. PATENT DOCUMENTS

| | | | |
|---|---|---|---|
| 3,249,653 | 5/1966 | Amerongen et al. | 260/861 |
| 3,485,732 | 12/1969 | D'Alelio | 204/159.15 |
| 3,609,109 | 9/1971 | Plesske | 260/22 |
| 3,631,154 | 12/1971 | Kawaguchi | 525/387 |
| 3,660,371 | 5/1972 | Johnson et al. | 117/93.31 |
| 3,679,731 | 7/1972 | Parker et al. | 260/475 P |
| 3,690,927 | 9/1972 | Parker et al. | 117/93.31 |
| 3,794,610 | 2/1974 | Bachmann | 525/23 |
| 3,925,322 | 12/1975 | Azuma | 525/445 |
| 3,928,420 | 12/1975 | Fang | 260/475 P |
| 3,933,939 | 1/1976 | Isozaki et al. | 260/872 |
| 4,014,854 | 3/1977 | Stevens et al. | 260/47 EQ |
| 4,039,705 | 8/1977 | Douek | 525/445 |

*Primary Examiner*—John C. Bleutge
*Assistant Examiner*—Patricia Short
*Attorney, Agent, or Firm*—Alan C. Cohen

[57] ABSTRACT

This invention relates to an anaerobic adhesive and method of making the same, comprising the reactive product of a glycidyl acrylate and a hydroxyl containing polyester. The reaction between the glycidyl acrylate and the polyester typically takes place in the presence of a radical inhibitor and an acid accelerator with oxygen present. The resulting adhesive is a single component, structural adhesive which will cure in an anaerobic environment.

7 Claims, No Drawings

ACRYLIC MODIFIED POLYESTER ANAEROBIC ADHESIVE

CROSS REFERENCE TO RELATED APPLICATION

This application relates to U.S. application Ser. No. 591,729, filed on even date herewith by Roscoe A. Pike and Foster P. Lamm for A TWO-COMPONENT ACRYLIC MODIFIED POLYESTER ADHESIVE.

TECHNICAL FIELD

The technical field to which this invention pertains is anaerobic adhesives and in particular modified acrylic containing adhesives.

BACKGROUND ART

Anaerobic and modified acrylic adhesive systems have achieved acceptance as substitutes for mechanical fastening methods. This acceptance is largely due to the fact that such adhesives cure at room temperature, require no mixing or metering, allowing for higher productivity and thereby decreasing the energy and labor costs associated with either conventional adhesives or mechanical fastening methods. Fundamental to the performance of such adhesive systems is their ability to provide both the rigidity required for high tensile strength and the toughness and flexibility required for high peel and impact resistance as well as good bond strength. Initially anaerobic adhesives were introduced as locking and sealing compounds. Although these adhesives were capable of improving the strength and reliability of threaded fasteners and sealing leaks, they did not possess the flexibility and toughness of a true structural adhesive.

One approach to overcoming the inflexibility of the adhesive is to combine dimethacrylates and urethanes. The modified acrylics are normally solutions of monomethacrylate monomers and polymeric rubbers. There are also systems available which are made using higher molecular weight monomethacrylates, which impart greater flexibility to these adhesives. In general, however, both types of systems are two-part systems similar to epoxys. In these systems one part consists of the polymer, monomer or initiator while the other part contains the activator. All of these systems require mixing and measuring prior to their being applied to the structure to be bonded.

Therefore, what is needed in the art is a single component anaerobic adhesive which will have the properties of a true structural adhesive, such as good flexibility and toughness.

DISCLOSURE OF INVENTION

The present invention comprises an acrylic modified polyester, single component anaerobic adhesive. This adhesive comprises the reaction product of a hydroxyl containing polyester and a glycidyl acrylate wherein the ratio of —OH groups in the polyester to glycidyl groups in the acrylate is from about 1:0.4 to about 1:1.

Another aspect of the invention is a method of making the anaerobic adhesive by reacting a hydroxyl containing polyester with a glycidyl acrylate wherein the ratio of hydroxyl to glycidyl groups is about 1:0.4 to about 1:1. To these reactants is then added about 0.01% to about 2% of a free radical inhibitor and about 0.5% to about 2% by weight of a catalyst. The weights of both the inhibitor and catalyst are based on the amount of polyester used in the reaction. The reaction takes place in an atmosphere containing at least 5% oxygen to prevent the resulting adhesive from curing.

Other objects and advantages of the present invention will become more apparent from the following detailed description of the best mode.

BEST MODE FOR CARRYING OUT THE INVENTION

Any hydroxyl containing polyester which is in liquid form at temperatures below 50° C. or can be dissolved in an appropriate aprotic solvent such as dioxane, tetrahydrofuran, acetonitrile may be used to practice this invention. The polyester may contain aliphatic, aromatic, branched or straight chained groups with the presence of aromatic being preferred. In general, the hydroxyl containing polyester is formed by reacting a di-, tri-, or tetra-carboxylic acid or an anhydride with a polyhydric alcohol. Some typical carboxylic acids which may be used are maleic acid, citraconic acid, itaconic acid, trimellitic acid, isophthalic acid, and dimethyl terephthalate. Some polyhydric alcohols which may be used are glycerol, ethylene glycol, di-ethylene glycol and 1,2-propane diol. The above cited reactants are merely exemplary and are not intended to be limiting. Other conventional carboxylic acids and their anhydrides as well as other polyhydric alcohols may be used.

Typically, liquid hydroxyl containing polyesters may be prepared by reacting a carboxylic acid or anhydride with a polyhydric alcohol using any conventional technique. One such technique may be found in *Methods of Polymer Chemistry* by W. R. Sorenson and T. W. Campbell, second edition, published by Interscience 1968, the disclosure of which is incorporated by reference. The polyester should be formulated such that the hydroxyl equivalent weight is about 150 to about 250 with a preferred range of about 195 to about 200. An important feature that underlies the hydroxyl equivalents present in the polyester is that they should be sufficient in number to react with the epoxy groups present in the acrylate to produce the necessary adhesive properties. In general, the higher the hydroxyl equivalents, the greater the number of the epoxy-hydroxyl reactions and the stronger the resulting adhesive will be. In addition, the higher the number of epoxy-hydroxyl reactions, the less flexible will be the resulting adhesive. The variation of the epoxy to hydroxyl ratio is most easily controlled by varying the ratio of the di-, tri- and tetra-carboxylic acids to each other. Typically, the polyesters prepared having these parameters will have a viscosity at room temperature of about 5,000 cps to about 50,000 cps, with a viscosity of 6,000 to 10,000 cps being preferred.

The glycidyl acrylates which are used to react with the polyester in preparing these adhesives, should be soluble in the polyester and may be aromatic, aliphatic, straight-chained or branched. The preferred acrylates are glycidyl mathacrylate, and glycidyl acrylate and their preparations is known to those skilled in the art (i.e. U.S. Pat. No. 2,524,432 the disclosure of which is incorporated by reference herein). Other glycidyl acrylates which may be used are listed in Table I below:

TABLE I 2-phenyl, glycidyl acrylate
p-anisyl, glycidyl acrylate
o-chlorophenyl, glycidyl acrylate

TABLE I-continued p-cuminyl, glycidyl acrylate

The methacrylate derivatives of the above acrylates, may also be used.

Typically, the reaction between the hydroxyl containing polyester and the glycidyl acrylate is performed as follows. The liquid polyester is introduced into the reaction vessel with or without a solvent. The acrylate is then added to the polyester with stirring. The amount of glycidyl acrylate which is added to the polyester is typically such that the hydroxyl to epoxy ratio is from about 1:1 to about 1:0.4 with 1:1 being preferred. In the case where the ratio is less than 1:1, the resulting adhesive will generally have greater flexibility but lower adhesive properties. It should be noted that for purposes of this application, the term glycidyl refers to an epoxy group.

During these reactions, it is likely that some undesirable cross-linking of the vinyl groups present may occur and therefore an inhibitor such as hydroquinone, butylated hydroxy toluene (BHT) or butylated hydroxy analine (BHA) is added. The inhibitor should be added prior to the introduction of the acrylate and in sufficient amounts to prevent such cross-linking from occurring. Typically, these are added in amounts of about 0.01% by weight to about 2.0% by weight with about 0.1% by weight being preferred. The percent by weight as recited above is in relationship to the total weight of the reactants.

Additionally, these reactions may require the presence of a catalyst to cause the reaction to take place within a reasonable time. Two such catalysts which have been determined to work well are sulfuric acid and boron trifluoride etherate. Typically, these catalysts are present in concentrations which range from about 0.001% to about 2.0% by weight of the total reactants present. Other catalysts which may be used are AlCl$_3$ and SnCl$_4$.

Subsequent to the addition of the catalyst and inhibitor and with constant stirring at temperatures ranging from about 60° F. (15.5° C.) to about 90° F. (32.2° C.), the addition reaction is initiated. Typically, these reactions are exothermic and the temperature of the reactants will rise to about 50° C. There is no temperature limitation to these reactions except that the temperature should not be allowed to rise above the polymerization temperature of the glycidyl acrylate. This polymerization temperature will also be dependent on the quantity of the cross-linking inhibitor. Typically, the temperature should not exceed about 75° C. It should be pointed out that since the resulting reaction product is an anaerobic adhesive, it is required that sufficient oxygen be present during the reaction to prevent the adhesive from curing in the reaction vessel. Typically, this is in amounts ranging from about 5% to about 20% or more by volume of oxygen in the reaction flask. The reaction of the acrylate with the polyester is allowed to continue until little or no free acrylate is present. In the case of the components having an epoxy to —OH ratio of 1:1, this would mean substantially all of the hydroxyl groups will be reacted. It is not necessary, and it may be desirable to react fewer of the hydroxyl groups, i.e. 25%, 50% or 75%, in these situations, the resulting product will be a more flexible adhesive but one having diminished adhesive properties. Generally the reaction time is from about 1 to about 16 hours depending on the extent of the %—OH reacted. The higher the percentage of the —OH reacted, the longer the reaction time. The progress of the reaction and the % of the hydroxyl groups reacted may be followed using conventional infrared or chromatographic techniques.

It has been found that in those cases where the reaction takes place in the presence of an acid catalyst, i.e. sulfuric acid, or boron trifluoride-etherate, the resulting product must be neutralized before it will react as an adhesive. It is believed that the acid acts as an inhibitor to the polymerization of the acrylate groups during curing, which are introduced during the reaction of the glycidyl acrylates with the polyester. Although it is believed that any neutralizing agent may be used, for example inorganic amines, sodium hydroxide, ammonium hydroxide, or carbonates, the preferred materials are alumina and calcium carbonate. These neutralizing agents are added in sufficient quantities to raise the pH of the modified polyester to about a pH of 7 or higher.

In addition to acting as neutralizing agents, it has been found that in the case of alumina and calcium carbonate, these materials also act as fillers and are useful in controlling the final viscosity of the adhesive. In many instances, the viscosity of the resulting adhesive will be so low that it may be difficult to maintain it in its preferred position while curing. Therefore, a filler material may be added to increase the viscosity. Such fillers as mentioned, as well as others, and their use in this manner, are known and do not constitute part of this invention. Typically, these fillers will be added in amounts from about 10% by weight to about 60% by weight with about 40% to about 50% preferred.

EXAMPLE I

A hydroxyl containing polyester was prepared using the following reactants:

| Material | % by weight |
| --- | --- |
| Tetra-butyl titinate | 0.10 |
| Di-methyl terephthalate | 29.25 |
| Isophthalic anhydride | 8.34 |
| Tri-mellitic anhydride | 9.65 |
| Di-ethylene glycol | 52.66 |

This polyester was prepared by reacting the above anhydrides and polyols using conventional techniques at temperatures from about 93° C. to about 135° C. and resulted in a polyester having an OH to COOH ratio of 1.8:1.0, a di-acid to tri-acid ratio of 2.67:1, and an OH equivalent weight of 197. Its viscosity was 9600 cps at 30° C.

Of the above-described hydroxyl containing polyester, 39.4 grams were placed in a 500 cc three-necked flask equipped with a mechanical stirrer and a thermometer. Then 0.01 gram of a hydroquinone was added and mixed thoroughly with the polyester. While stirring continued, 28.4 grams of glycidyl methacrylate (available from Polysciences Inc., Warrington, Pa., or Alcolac Inc., Baltimore, Md.) was added. The mixture was stirred and 0.6 gram of concentrated sulfuric acid was added. The stirring continued and an exothermic reaction occurred raising the temperature from about 25° C. to about 75° C. and remained there during the course of the reaction. The reaction was allowed to continue for approximately eight hours (until the polyester was about 100% acrylated). The resultant adhesive had a viscosity of 130,000 cps at 70° C. and was neutralized by the addition of 5.0 grams of alumina.

EXAMPLE II

The same reaction ingredients and conditions as in Example I were utilized except in lieu of the sulfuric acid catalyst, 0.5 gram of boron trifluoride etherate was added and no neutralizing agent was used.

The neat adhesives made from Examples I and II were tested for torque strength. Experiments were also performed to determine the effect peroxide, curing temperatures, as well as filler materials, and modifiers had on the properties of the cured adhesive. The results of this testing are listed in Table III along with the particular additives tested and the curing conditions. The peroxide added was dicumyl peroxide in concentrations of about 0.5% by weight. A conventional unsaturated material such as tri-allyl cyanurate, was added to the adhesive to alter its physical properties, i.e. flexibility and bond strength. Other such materials which may be used in this manner are listed in Table II. These materials are typically added in concentrations of about 5% to about 100% by weight of adhesive.

TABLE II

Triallyl cyanurate
Trimethylol propane triacrylate
1,6-hexane diol diacrylate
2-ethyl hexyl acrylate
Ethylene glycol dimethacrylate
Pentaerythritrol tetramethacrylate
Epoxylated bisphenol A dimethacrylate
Isopropyl methacrylate

TABLE III

| Composition | Cure | Torque inch/ pounds |
|---|---|---|
| 1. Polyester - 100% acrylated + 10 weight percent isopropyl methacrylate. | 0.2 weight percent dicumyl peroxide, 180° C. ½ hr. | 5 |
| 2. Polyester - 100% acrylated + 50 weight percent cabosil filler. | 0.2 weight percent dicumyl peroxide, 180° C. ½ hr. | 37 |
| 3. Polyester - 100% acrylated + 10 weight percent triallyl cyanurate. | 0.2 weight percent dicumyl peroxide, 170° C. ½ hr. | 19 |
| 4. Polyester - 100% acrylated + 50 weight percent cabosil filler and 10 weight percent triallyl cyanurate. | 0.2 weight percent dicymyl peroxide, 170° C. ½ hr. | 55 |
| 5. Polyester - 100% acrylated + 10 weight percent triallyl cyanurate. | Heat 2 hrs. boiling water after cure. | 30 |
| 6. Polyester - 100% acrylated + 50 weight percent cabosil filler and 10 weight percent triallyl cyanurate. | Heat 2 hrs. boiling water after cure. | 75 |
| 7. Polyester - 100% acrylated + 50 weight percent alumina. | No peroxide, 170° C. ½ hr. | 135 |
| 8. Polyester - 100% acrylated + 50 weight percent alumina. | 0.2 weight percent dicumyl peroxide 170° C. ½ hr. | 130 |
| 9. Polyester - 100% acrylated + 50 weight percent alumina | No peroxide, 25° C. cure 16 hrs. | 75 |
| 10. Polyester - 100% acrylated. | No peroxide, 25° C. cure 16 hrs. | 5–10 |
| 11. Polyester - 100% acrylated + 10 weight percent isopropyl methacrylate. | No peroxide, 25° C. cure 16 hours | 8 |

Test specimens were prepared using 100% acrylated adhesive, meaning substantially all of the hydroxyl groups of the starting polyester had been reacted with the glycidyl methacrylate. In Table III, the effect of a peroxide accelerator, temperature and a modifier (1,3) as well as filler with and without the modifier (2,4,8) in the neat adhesive was evaluated. In addition, the effect of boiling water on compositions 3 and 4 was tested (5,6). Specimens were prepared and tested without the peroxide accelerator using room and elevated temperature to cure the adhesives. The effect of monomer diluent (11), and filler (7,9) compared to the neat adhesive (10) were defined.

The test used to evaluate the various combinations comprised bonding a screw and nut together with the adhesive and determining the force (torque) required to break the bonded unit. Typically, adhesives having torque strength of 25 psi or greater are useful as adhesives. It is clear that a number of the specimens tested using the adhesive exceed this criteria. In addition, it does not appear that such adhesives are adversely affected by moisture.

Tensile lap shear tests were also performed on the neat adhesive. The specimens were prepared by applying the adhesive to aluminum strip under 50 psi of pressure for 16 hours at room temperature and forming a bondline of about 0.5 inch per ASTM D1002, the disclosure of which is incorporated herein by reference. The results are in Table IV.

TABLE IV

| Cure | Tensile Lap Shear, Psi |
|---|---|
| RT | 956 |
| RT | 927 |
| RT | 919 |

Adhesives such as these may be used wherein the substrate material will allow the adhesive to penetrate it. Some typical materials with which the adhesive may be used are wood, glass, ceramics, paper and metal.

Applications for such adhesives range from sealing cracks in castings to rebuilding automotive and appliance parts to sealants which are useful in marine environments.

Adhesives made using this method are single component systems. Such systems are easy to use, do not require any pre-mixing or measuring so there is no opportunity that the adhesive will fail due to improper preparation. In addition, the adhesives have excellent water resistance. The adhesives of this invention may be tailored to have specific properties, i.e. flexibility, shear strength, etc. for a particular task. The advantages of these adhesives make this an attractive alternative to the anaerobic adhesive which is available today.

It should be understood that the invention is not limited to the particular embodiments shown and described herein, but that various changes and modifications may be made without departing from the spirit and scope of this novel concept as defined by the following claims.

We claim:

1. An anaerobic adhesive acrylate comprising the reaction product of a hydroxyl containing polyester and a glycidyl acrylate wherein the ratio of —OH in the polyester to glycidyl groups in the acrylate is from about 1:0.4 to about 1:1, and the reaction product is capable of polymerizing in an anaerobic environment.

2. The adhesive of claim 1 wherein the glycidyl acrylate is glycidyl methacrylate.

3. The adhesive of claim 1 wherein the polyester has a hydroxyl equivalent weight of about 150 to about 250.

4. A method for making an anaerobic adhesive comprising:

placing a polyester having a hydroxyl equivalent weight of about 150 to about 250 into a reaction vessel, adding about 0.01% to about 2% by weight of a free radical inhibitor based on the weight of the polyester, adding about 0.5% to about 2% by weight a reaction catalyst, based on the weight of the polyester, adding sufficient glycidyl acrylate to produce a ratio of hydroxyl to glycidyl groups in the reaction products of about 1:0.4 to about 1:1, maintaining an atmosphere of at least 5% oxygen over the reactants during formation of the anaerobic adhesive.

5. The method of claim 4 wherein the free radical inhibitor is hydroquinone.

6. The method of claim 5 wherein the catalyst is sulfuric acid or boron trifluoride etherate.

7. The method of claim 4 wherein the reaction catalyst is an acid and the resultant acrylic modified polyester is neutralized to a pH of at least 7.

* * * * *